Dec. 21, 1965  R. A. DENNING  3,224,121
APPARATUS FOR OPTIMIZING DREDGE PRODUCTION
Filed Jan. 29, 1963  2 Sheets-Sheet 1

INVENTOR.
RICK A. DENNING
BY *Joseph A. Hill*
ATTORNEY

Dec. 21, 1965  R. A. DENNING  3,224,121
APPARATUS FOR OPTIMIZING DREDGE PRODUCTION
Filed Jan. 29, 1963  2 Sheets-Sheet 2

INVENTOR.
RICK A. DENNING
BY Joseph A. Hill
ATTORNEY

United States Patent Office 3,224,121
Patented Dec. 21, 1965

3,224,121
APPARATUS FOR OPTIMIZING DREDGE PRODUCTION
Rick A. Denning, Bronx, N.Y., assignor to the United States of America as represented by the Secretary of the Army
Filed Jan. 29, 1963, Ser. No. 255,159
4 Claims. (Cl. 37—58)
(Granted under Title 35, U.S. Code (1952), sec. 266)

The invention described herein may be manufactured and used by or for the Government for governmental purposes without payment to me of any royalty thereon.

This invention relates to the field of marine dredges, more particularly to the field of metering and control means designed to regulate the production of suction dredges.

Suction dredges have long been equipped with instruments to furnish intelligence to the dredge operator so that he may control production by regulating the speed of the suction pump and the position of the draghead in relation to the channel bottom. Instruments and systems for indicating the suction and discharge pressures of the dredge pump, the power demand of the pump, and the tension in the draghoist cable are old in the art. More recently instruments and systems designed to measure continuously the velocity, density and rate of solids flow of the dredged mixture have been proposed and used. Although all these devices furnish valuable intelligence, a dredge operator cannot, unaided, make efficient use of so much diverse information. The changes in the various process parameters often occur so rapidly the operator is unable to read all the instruments and evaluate their significance. Consequently, the operator tends to concentrate on only one or two parameters such as cable tension and vacuum; the dredge then works at less than maximum productivity.

It is an object of this invention to provide novel and improved apparatus to assist in controlling the production of a marine dredge.

It is another object of this invention to provide novel and improved apparatus which automatically correlates information about the process parameters of a dredging operation and isssues simplified command signals concerning corrections to be made in pump speed and draghoist cable tension.

Figure 1:
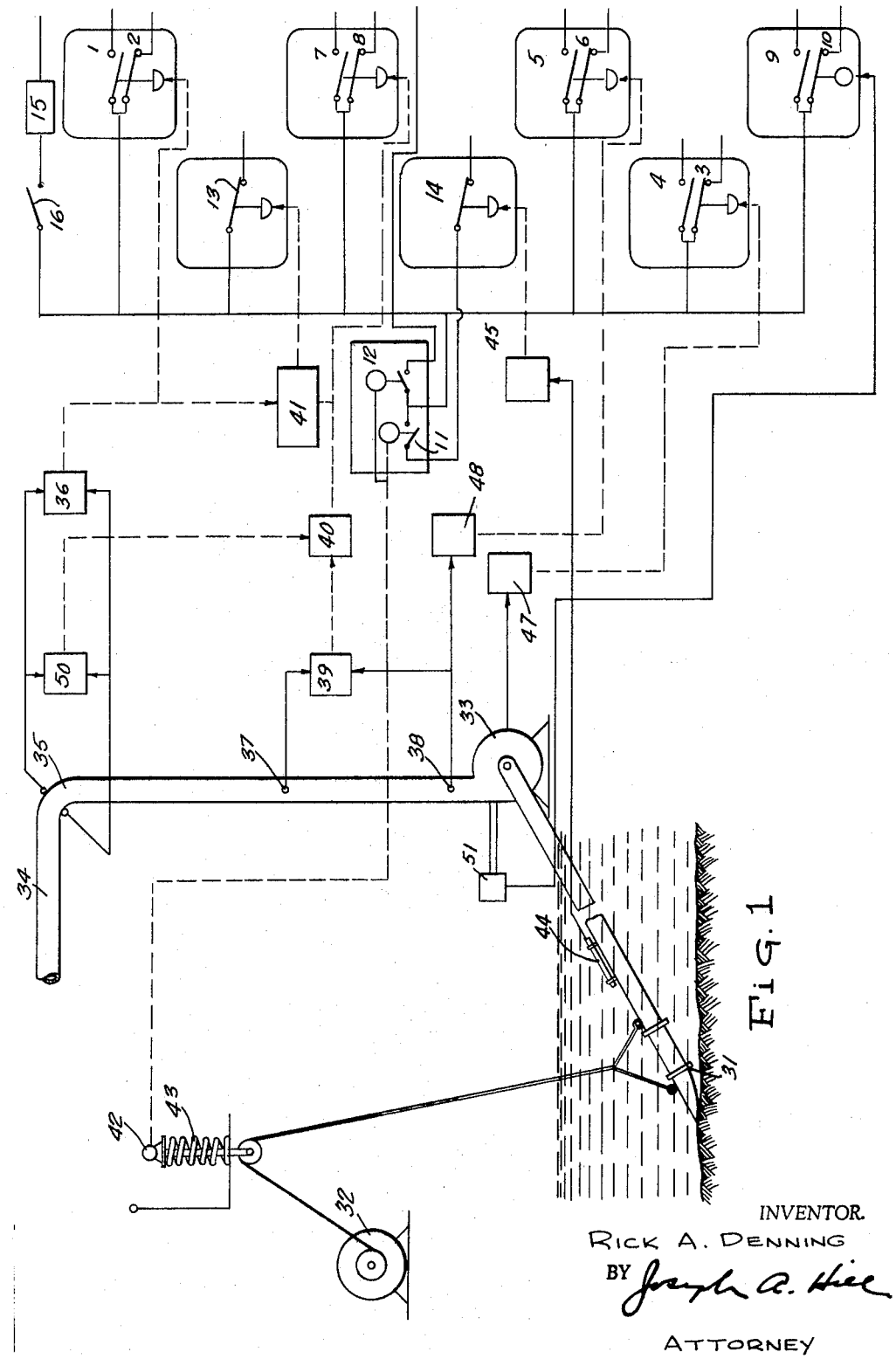
Figure 2:
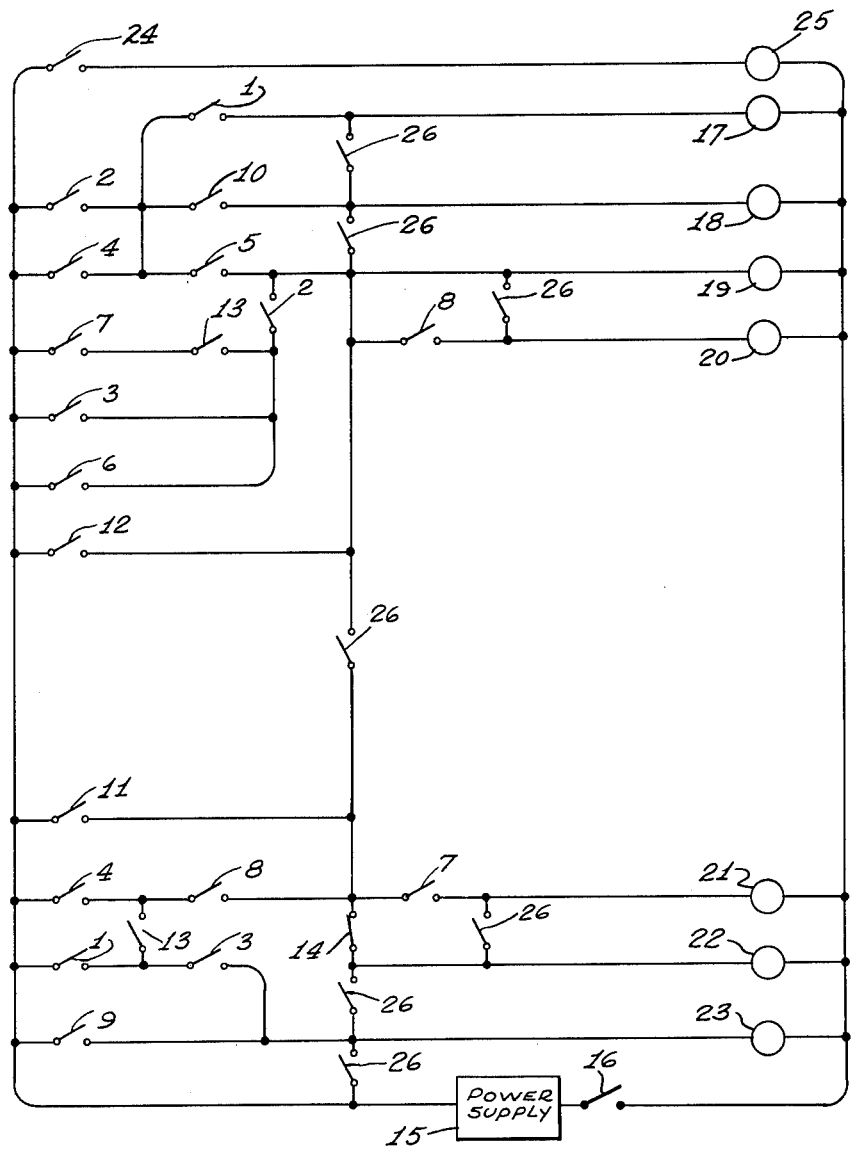

Further objects and advantages of the present invention will be apparent from the following description thereof with reference to the accompanying drawings wherein:

FIG. 1 is a schematic representation of the equipment of the instant invention carried on the dredge; and FIG. 2 is a circuit diagram showing the interconnection of the switches of FIG. 1 into the logic circuit of the instant invention.

The present invention is used on a marine dredge of the conventional type which for the sake of clarity is not shown in the drawings. It is to be understood that the following equipment is carried on said dredge. The dredge has a draghead 31, means for regulating the position of the draghead 31 such as a draghoist 32, a suction pump 33, a discharge pipe 34, and measuring means for continuously determining the operating conditions of the dredged mixture and the dredge pump and for determining the position of the draghead in relation to the channel bottom. The invention functions most efficiently when used on a dredge equipped with measuring means capable of determining the velocity, density and solids flow rate of the mixture in the dredge pipe, the suction and discharge pressures of the dredge pump, the power demand of the dredge pump, and the cable tension of the draghoist. A primary control means is associated with each of the instruments or systems which measures one of these parameters. When a particular parameter falls below or exceeds predetermined limits, coincident with efficient dredge production, the associated primary control means produces a signal. The apparatus continuously correlates the separate signals produced by the primary control means and issues a command signal which may visually apprise the dredge operator of a correction to be made or which may fed into another device for automatically making the necessary correction. The basic command signals are "increase pump feed," "decrease pump speed," "raise draghead," and "lower draghead." The apparatus may employ a variety of electrical, pneumatic, hydraulic or mechanical means to correlate the data concerning the process parameters and to issue suitable command signals. For illustrative purposes an apparatus employing an electrical logic circuit will be described in detail.

The measuring means which are not part of the present invention may be any of a number of well-known instruments and systems for measuring the required process parameters. For example, the means for measuring velocity, density, solids flow rate, suction and discharge pressure may comprise a purge water system having five purge water controllers, one of the controllers, on the suction side of the pump, being a vacuum unit and the other four controllers, located in the discharge pipe being pressure units. The vacuum unit is used in measuring the pump vacuum. Two of the four pressure units are used in developing the flow density signal and the other two the flow velocity signal. The pressure unit nearest the dredge pump also produces the pump discharge pressure signal. The pressure and vacuum signals might be developed as pneumatic, electric or other type signals. In the measuring means being described the pump suction and discharge pressure signals are developed directly. The velocity, density, and solids flow rate measurement signals are produced by systems which compute the desired signals from the basic pressures supplied by the four pressure type purge water controllers.

The velocity signal may be arrived at by measuring the differential pressure between the inside and outside radii of an elbow 35 in the discharge pipe. This differential pressure may then be applied to the input side of a pneumatic flow transmitter 36 which converts it to a pneumatic signal linearly proportional to the square root of the differential pressure. Since the input differential pressure can be assumed to be directly proportional to the square of the velocity flow (neglecting density effect) the output signal of the flow transmitter is linearly proportional to the flow velocity.

The density of the dredged mixture may be determined by applying the water purge pressures developed at two points 37 and 38 fifty inches apart in elevation on a rising section of the dredge pipe to a pressure differential measuring device 39 which develops a pneumatic signal proportional to their pressure difference. The output signal consists of two components. First, buoyant density (i.e. density of the water-solids mixture minus the density of water) and second, an increment of differential pressure due to friction loss when flow occurs in the pipe. The friction component is removed by subtraction, in a ratio totalizer relay 40 or comparable device, of a portion of the differential pressure used in measuring velocity and transmitted to relay 40 by pressure transmitter 50.

The solids flow rate measurement signal may be produced by a computing instrument 41 which receives the pneumatic signals from the density and the velocity measuring means and combines these signals with the proper scale factor to produce a continuous pneumatic flow rate signal. The solids flow rate accordingly is zero when the velocity is zero or when the buoyant density is zero, e.g. when the dredge is blocked or is pumping water.

A suitable method for measuring draghoist cable tension consists of measuring by an electrical transducer 42 of the continuous function analogue type the contracting motion of the shock absorbers 43 associated with the draghoist. The draghoist cable tension decreases as the weight of the draghead is gradually transferred from the hoist cables to the river bottom. Cable tension also decreases as the dredge speed through the water is increased and as the flow friction across the draghead is decreased.

Pump power demand measurement signals may be developed by any of a number of well-known means 51.

The primary control means, although not unique in themselves, are a part of the invention. A primary control means is associated with each of the described measuring means for producing a separate signal when the velocity, density, suction, discharge pressure, pump power, and draghoist cable tension measurements exceed or fall below predetermined limits. A primary control means is also associated with the solids flow measuring means for producing a signal when the solids flow rate falls below a predetermined level. There need be no signal for high solids flow rate since excessive solids flow is never a problem. The primary control means must of course be chosen with reference to the measuring means. The primary control means may consist of meter relays, gauges fitted with electrical contacts, pressure-vacuum controls or other comparable devices. They should be readily adjustable aboard the dredge over a wide range. The high and low limits of the process parameters to which the primary control means respond are the limits within which the various process parameters must fall for efficient dredge production. Each primary control means should be designed to reset itself automatically when the measuring signal to which it responds reverses itself and passes the control set point by a small differential.

With reference to the drawings, pressure actuated switches 1–8, 13 and 14 and electrically actuated switches 9–12 are part of the primary control means. The measuring means and the other components of the primary control means which consist of well-known devices and systems as outlined above are not shown in the drawing. Each signal produced by a primary control means operates one of the switches 1 through 14 of the logic circuit. When the velocity of the dredged mixture exceeds a predetermined upper limit the primary control means associated with the velocity measuring means will cause high velocity switch 1 to close. When velocity again returns to the acceptable range switch 1 will reopen. When the velocity falls below a predetermined lower limit low velocity switch 2 will close and remain closed until the velocity again rises to an acceptable level.

High vacuum switch 3 is closed when the vacuum on the suction side of the pump as transmitted by pressure transmitter 47 exceeds a predetermined limit. Low vacuum switch 4 closes when the vacuum on the suction side of the pump falls below a predetermined limit. High pressure switch 5 is closed when the pump discharge pressure taken at 38 and transmitted by pressure transmitter 48 exceeds a predetermined level; low pressure switch 6 is closed when the pump discharge pressure falls below a predetermined level. High density switch 7 is closed when the density of the mixture passing through the dredge exceeds a predetermined level; low density switch 8 is closed when that density falls below a predetermined level. High pump power switch 9 is closed when the power demand of the pump exceeds a predetermined figure; low pump power switch 10 is closed when the power demand is less than a predetermined figure. High cable tension switch 11 is closed when the draghoist tension exceeds a predetermined level; low cable tension switch 12 is closed when the draghoist cable tension falls below a predetermined level. Low solids flow switch 13 is closed when the solids flow rate of the dredged mixture falls below a predetermined level. There is no high solids flow switch since excessive solids flow rate of the dredged mixture is never a problem.

Normally closed drag depth limit switch 14 is provided to avoid over depth dredging and to guard against paying out all the cable on the draghoist 32 by lowering the draghead 31 too far. The drag depth limit switch 14 is set so that it opens automatically when the draghead 31 is lowered to a desired reference depth. The water pressure at the determined depth is sensed at 44 and transmitted to pressure switch 14 by means of pressure transmitter 45. As will appear more clearly hereafter, the drag depth limit switch thus cancels out any commands to lower the draghead beyond the reference depth.

The logic circuit is provided with a power supply 15 and a switch 16 for selectively connecting the power supply into the circuit.

The process parameter switches and the drag depth limit switch heretofore described are connected into the logic circuit in the manner shown in the figure along with electrical indicating instrumentalities such as lamps 17 through 23. Each electrical indicating instrumentality functions when one or more associated parameter switches are closed completing a circuit from the power supply through the switches through the electrical indicating instrumentality back to the power supply. In their simplest form the electrical indicating instrumentalities may be lamps. When a particular lamp 17 through 23 is illuminated the dredge operator is thereby apprised that a condition exists requiring that he take corrective action.

Lamp 17 when lit is a command to adjust the velocity set point. Lamp 18 when lit is a command to increase pump speed. Lamp 19 when lit is a command to raise the draghead. Lamp 20 when lit is a command to adjust the low density set point. Lamp 21 when lit is a command to adjust the high density set point. Lamp 22 when lit is a command to lower the draghead. Lamp 23 when lit is a command to lower the pump speed.

The logic circuit includes a test circuit so that the operator may periodically ascertain whether the electrical indicating instrumentalities, such as lamps 17 through 23, are in working order. Manual testing switch 24 when closed permits power supply 15 to energize the coils of relay 25. Relay 25 then causes the seven normally open test switches 26 to close simultaneously. All the lamps are then connected to the power supply and will, unless burned out, be illuminated.

The manner in which the logic circuit of the drawing functions and produces command signals enabling the dredge operator to improve dredge production will now be explained. When pump power becomes excessive switch 9 closes causing command signal light 23 to be illuminated thus informing the operator that he should reduce pump speed. On low draghoist cable tension, switch 12 closes lighting command signal 19, the signal to "raise draghead."

As the contour of the bottom falls away from the draghead the draghead inlet will be suspended off the bottom and will suck in water and very little silt. The vacuum and the density will decrease. The full weight of the drag will be transferred to the hoisting cables. The proper corrective action for this situation is a lowering of the draghead. Therefore, on high cable tension switch 11 closes causing command light 22 to signal "lower draghead" or low vacuum switch 4 and low density switch 8 closed causing the same command signal. As noted previously, drag depth limit switch 14 which is normally closed will open to cancel any command to lower the draghead beyond the desired reference depth. Switch 11 or the combination of switches 4 and 8 remain closed until the draghead is partially supported by the channel bottom at which time they open and the command lamp 22 to lower draghead goes out. By this technique the time lost pumping water instead of solids is reduced.

Should the suction head be completely buried in the bottom material, due to a cave-in or for any other reason, the density of the dredged mixture will increase, the vacuum being drawn by the pump will increase and finally the flow of dredged material will be cut off reducing velocity and discharge pressure. To provide for these conditions, on a combination of high vacuum and low velocity switches 2 and 3 will close completing a circuit to command signal light 19, the signal to raise draghead. Command light 19 is similarly illuminated on a combination of low discharge pressure and low velocity which closes switches 6 and 2.

When a plug is formed in the discharge line or the discharge line is loaded up the discharge pressure increases while the velocity and vacuum decrease. Furthermore when the velocity decreases the dredge pump unloads. On the combination of low velocity and low pump power switches 2 and 10 are closed illuminating command signal lamp 18 thereby informing the dredge operator that pump speed should be increased. As an added precaution on the combination of high discharge pressure and low velocity or the combination of high discharge pressure and low vacuum, switches 5 and 2 or 5 and 4 will be closed respectively causing the command signal 19 for raising the draghead to be lit.

When the pump power, velocity and vacuum are low the dredge is transporting solids at less than its full capacity. On low pump power and low velocity switches 10 and 2 close causing the command to increase pump speed to be given by command lamp 18. The same signal is given when low pump power and low vacuum causes switches 10 and 4 to close. When both density and vacuum are low the dredge is likewise transporting solids at less than capacity. Accordingly, when switches 8 and 4 are closed the command signal lamp 22 is lit directing the operator to lower the draghead. On the other hand the failure to utilize the full dredging capacity of a pump may be due to excessive vacuum. When excessive vacuum is caused by high velocity, switches 1 and 3 close causing command light 23 to be lit thereby giving the signal to lower pump speed. When excessive vacuum is due to high density of dredge mixture the velocity of the mixture falls off and the "raise draghead" signal light 19 is lit. The combination of switches which brings this about are either switches 2 and 3 or 2, 7 and 13.

As the draghead is lowered into the bottom material the solids content will increase, increasing the solids flow rate. However the capacity of the dredge pump falls off with increased density and the velocity decreases until finally the mixture is moving so slowly that the solids flow rate is reduced. The vacuum also falls off as the velocity (or flow friction) decreases. On low solids flow rate with low velocity and high density switches 2, 7 and 13 close lighting command lamp 19 and signalling "raise draghead." If pump power is low and discharge pressure is high with low velocity, high density, and low solids flow rate, switches 10, 5, 2, 7 and 13 close lighting command lamp 18 and signalling "increase pump speed." On the other hand as the draghead is raised off the bottom the velocity of the dredged mixture will increase increasing the solids flow rate. The density falls off however until a point is reached when the mixture is so thin that the solids flow rate again decreases. On low solids flow rate with high velocity and low density switches 13, 1 and 8 close lighting lamp 22 and signalling "lower draghead." In the manner described above the solids flow rate can be maintained at an optimum level.

In addition to the signals to increase pump speed, raise draghead, lower draghead and lower pump speed given by command signal lamps 18, 19, 22 and 23, respectively, command signal lamps 17, 20 and 21 are provided which are illuminated when the switches of the logic circuit close according to a pattern which cannot legitimately occur during the dredging process. Accordingly if one of these commands is present it indicates either an electrical fault in the logic circuit or an improper setting of one of the control operating limits or setpoints. For example, when command signal lamp 17 (the adjust velocity setpoint command) is lit it indicates that switch 1 and either switch 2 or 4 or both of these switches are closed. This is an impossible operating situation since low velocity or low vacuum cannot occur simultaneously with high velocity. Similarly an error in the system is indicated when lamps 19 and 20 are simultaneously illuminated which can only occur when switch 8 is closed, inasmuch as the command to raise the draghead given by lamp 19 should not occur when density is low (indicated by closing switch 8). Likewise the simultaneous illumination of command lamp 21 (adjust high density set point) and command lamp 22 (lower draghead) indicates that switch 7 is closed and there must be an error in the system since the command to lower the draghead should not be given when the density is high (as indicated by the closing of switch 7).

Although the applicant's invention has been described primarily in terms of an electrical logic circuit having switches responsive to certain process parameters of a dredging operation it will be understood that many changes may be made in the apparatus without departing from the scope of the invention.

I claim:
1. In a suction dredge having a draghead, means for regulating the position of said draghead, a suction pump, and measuring means for continuously determining the operating conditions of the dredged mixture and the pump and the position of the draghead in relation to the channel bottom, the improvement comprising apparatus for controlling the output of the dredge, said apparatus comprising:
 (a) primary control means associated with each of the measuring means for producing a separate signal when the measurement produced by its associated measuring means exceeds or falls below predetermined limits; and
 (b) command signal means for correlating the separate signals produced by said primary control means and for selectively commanding corrections in the speed of said dredge pump and the position of said draghead.

2. In a suction dredge having a draghead, a draghoist means including cable means connected to said draghead for raising and lowering said draghead, a suction pump and measuring means for continuously determining the velocity, density and solids flow rate of the dredged mixture, the suction and discharge pressures of said dredge pump, the power required by said pump, and the cable tension of said draghoist, the improvement comprising apparatus for controlling the output of the dredge, said apparatus comprising:
 (a) primary control means associated with each of said measuring means for producing a separate signal when each of said velocity, density, suction, discharge, pump power and draghoist measurements exceeds or falls below pretermined limits, and when said solids flow measurement falls below a predetermined level; and
 (b) command signal means for correlating the separate signals produced by said primary control means and producing in accordance therewith selective commands to raise and lower said draghead and to increase and decrease the speed of said pump.

3. The apparatus described in claim 2,
 (a) wherein each of said primary control means selectively opens and closes an electrical switch;
 (b) wherein the command signal means comprises electrical indicating instrumentalities to report each type of command; and
 (c) wherein the said switches and said electrical indicating instrumentalities are connected in a logic circuit with a source of electrical current.

4. The apparatus described in claim 2 wherein the said primary control means and command signal means comprise:
 (a) normally open electrical switches individually responsive to high velocity, low velocity, high vacuum, low vacuum, high pressure, low pressure, high density, low density, high pump power, low pump power, high cable tension, low cable tension, and low solids flow;

(b) an individual electric lamp corresponding to each of said selective commands; and (c) a source of electric current; and (d) the said switches, lamps and source of electric current being interconnected in a logic circuit wherein the closing of one of said switches or a combination of said switches completes a circuit between the said source of current and the electric lamp corresponding to the command necessary to return the dredge to predetermined limits of operation.

References Cited by the Examiner
UNITED STATES PATENTS

| | | | |
|---|---|---|---|
| 2,043,413 | 6/1936 | Knox. | |
| 2,461,311 | 2/1949 | Cushing | 37—67 |
| 2,508,087 | 5/1950 | Bailey. | |
| 2,644,400 | 7/1953 | Hofer. | |
| 2,661,550 | 12/1953 | Graham | 37—58 |
| 2,795,873 | 6/1957 | Hoffman | 37—58 X |
| 2,889,779 | 6/1959 | Hofer | 37—58 X |
| 3,037,201 | 5/1962 | Kelley | 340—179 |

ABRAHAM G. STONE, *Primary Examiner.*

BENJAMIN HERSH, W. B. STONE, G. T. MOLLER, W. A. SMITH III, *Assistant Examiners.*